United States Patent
Hu et al.

(10) Patent No.: US 7,532,600 B2
(45) Date of Patent: May 12, 2009

(54) METHOD AND SYSTEM FOR USING HYBRID ARQ IN COMMUNICATION SYSTEMS THAT USE MULTIPLE INPUT MULTIPLE OUTPUT ANTENNA SYSTEMS

(75) Inventors: Teck H. Hu, Budd Lake, NJ (US); Jung-Tao Liu, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1111 days.

(21) Appl. No.: 10/423,358

(22) Filed: Apr. 25, 2003

(65) Prior Publication Data
US 2004/0213184 A1    Oct. 28, 2004

(51) Int. Cl.
*H04B 7/216* (2006.01)

(52) U.S. Cl. .............. 370/335; 370/441; 455/452.1; 455/562.1; 714/748

(58) Field of Classification Search ............... None
See application file for complete search history.

(56) References Cited

U.S. PATENT DOCUMENTS

| | | | | |
|---|---|---|---|---|
| 6,751,480 | B2 * | 6/2004 | Kogiantis et al. | 455/562.1 |
| 7,016,658 | B2 * | 3/2006 | Kim et al. | 455/102 |
| 7,058,367 | B1 * | 6/2006 | Luo et al. | 455/101 |
| 7,298,717 | B2 * | 11/2007 | Hui et al. | 370/329 |
| 7,411,929 | B2 * | 8/2008 | Ling et al. | 370/334 |
| 2003/0067890 | A1 * | 4/2003 | Goel et al. | 370/310.1 |
| 2004/0027994 | A1 * | 2/2004 | Baines | 370/252 |
| 2004/0057530 | A1 * | 3/2004 | Tarokh et al. | 375/267 |

\* cited by examiner

Primary Examiner—Michael J Moore, Jr.

(57) ABSTRACT

A method and system for using one H-ARQ process in communication systems having a Multiple Input Multiple Output antenna system. Information to be transmitted is first coded using a particular coding scheme and having a particular base coding rate. The coded information is then divided into groups of sub-blocks of coded information. Each group of sub-blocks of coded information contains one or more sub-blocks where the number of sub-blocks in a group is determined from current channel conditions of an antenna through which the group is to be transmitted. The groups are then rate matched and modulated based on the current channel conditions and transmitted through one or more antennas. For any retransmissions, the same coded information is used and is divided into groups of sub-blocks of coded information where at least one new group is associated with one of the plurality of antennas; the number of sub-blocks of coded information in a new group is based on current channel conditions experienced by the associated one antenna. Each group of sub-blocks is again rate matched and modulated before transmission. The rate matching and modulation parameters for any group of sub-blocks are determined by the channel conditions of the antenna through which that particular group is to be transmitted.

19 Claims, 2 Drawing Sheets

METHOD AND SYSTEM FOR USING HYBRID ARQ IN COMMUNICATION SYSTEMS THAT USE MULTIPLE INPUT MULTIPLE OUTPUT ANTENNA SYSTEMS

BACKGROUND OF THE INVENTION

1. Field of the Invention

The present invention is generally related to communication systems and in particular to wireless communication systems.

2. Description of the Related Art

To improve the efficiency and throughput of a communication system, a technique known as ARQ (Automatic Repeat reQuest) is often used. The throughput of a system is the amount of source information successfully received by the system (i.e., no errors in the received information) over a defined period of time. ARQ is a procedure used in single antenna systems whereby once a transmitter has transmitted a block of information, it waits for a confirmation message from the receiver informing the transmitter whether the block of information was properly received or was received in error. If the block of information was properly received, the receiver transmits back an ACKnowledge message (ACK); in such a case the transmitter proceeds to the transmission of new information. However, if the block of information was received with errors or received in an unacceptable state (as defined by the system), the receiver transmits back to the transmitter a Negative ACKnowledgement (NACK) message. When the transmitter receives a NACK in response to a transmission, the transmitter can choose to retransmit the same block of information. In particular, the transmitter can retransmit the same block of information a number of times until it receives an ACK. The particular number of retransmissions for any block of information can be defined by the system.

Many communication systems use a particular version of ARQ called Hybrid ARQ or H-ARQ. In H-ARQ, after receiving the transmitted information and prior to transmitting back an ACK or a NACK confirmation message to the transmitter, the receiver performs the following: first, it detects whether the received information contains errors. If the received information contains errors, the receiver attempts to correct the error or errors through well-known error correction techniques. The correction of errors in received information by a receiver is called Forward Error Correction (FEC). There are well known protocols for transmitting and receiving equipment that define how the transmitted information is to be formatted and channel coded prior to transmission. The format is how the information is arranged and the channel coding is making the information more robust (i.e., strategically adding repetitions to the information and/or other kind of redundancies using well-known error correction techniques) so that it is less susceptible to anomalies in the communication channel through which it propagates. If the receiver is able to correct the errors it sends an ACK, but if the receiver is unable to correct the errors it sends a NACK confirmation message to the transmitter, which will retransmit the information. Unlike the ARQ technique, in H-ARQ, each retransmission may be combined with the previous transmissions before being decoded. This "combining" (often referred to as Incremental Redundancy) could improve the useful energy and/or the robustness of the received data.

In order to increase a capacity of a wireless communication system, many wireless communication systems now use multiple antenna systems to transmit and/or receive information. The capacity of a system is the total amount of information conveyed (i.e., transmitted and/or received) by a communication system over a defined period of time. The multiple antenna systems used are typically Multiple Input Multiple Output (MIMO) antenna systems that transmit and receive different information simultaneously. Because of the desirability to use MIMO antenna systems in wireless communication systems, there is also a desire to improve the performance and efficiency of such systems by applying the H-ARQ technique to such systems. However, using H-ARQ in MIMO systems presents several challenges. First, the complexity of managing such a system significantly increases if each antenna performs its own specific H-ARQ procedure. Also if each sub-block of information that is transmitted on each separate antenna is coded differently, the amount of signaling information (information transmitted over a signaling channel used to initiate, maintain and terminate communications) required for such a system would increase significantly as these signaling information are needed for each transmit antenna. A coded sub-block henceforth is the packet sent in each antenna that has been channel coded e.g., an FEC coder. Correspondingly, a coded block refers to the packet generated by the channel coder at the transmitter. The composite of all coded sub-blocks is equal to the coded block. Second, the quality of the channels associated with each antenna varies with time requiring that the antenna transmit and/or receive information at different rates and at different sub-block sizes depending on its state. For multiple H-ARQ processes, each process is typically controlled by a processor thereby tending to increase the complexity of the hardware and software associated with such multiple processes. Increased number of HARQ processes has also been shown to increase the reception time of the packets at the destination.

In a single input single output antenna system operating H-ARQ, the same information is retransmitted on all transmissions of an incoming packet. However, in a multiple input multiple output antennas system, the additional flexibility provided by the multiple antennas can be exploited. As the quality of the channels associated with the antennas changes, the same antenna may not be capable of handling the same information because of its changed state; less of the original information may have to be retransmitted because the antenna's state may be such that it cannot transmit the entire block of the original information. What is therefore needed is a system and method for using one H-ARQ process in a communication system that has a Multiple Input Multiple Output antenna system while avoiding the aforementioned disadvantages.

SUMMARY OF THE INVENTION

The present invention provides a system and method for performing Hybrid ARQ (H-ARQ) in wireless communication systems that use Multiple Input Multiple Output (MIMO) antenna systems with one H-ARQ operation created for the antennas. As a result, the increase in complexity can be avoided when one H-ARQ process is created for all the antennas. One coding process, i.e., a single FEC coder is used across all the antennas and hence only a single coded block (i.e., a single block of coded information) will be generated for the antennas. The system of the present invention is an H-ARQ MIMO system comprising a coder coupled to a distribution unit which is coupled to a plurality of antennas. Original information to be transmitted is coded by the channel coder, which operates at a fixed code rate (also called the base coding rate) and becomes coded information; for this invention the coded information is referred to as a coded block. The coded block is then distributed as packets by the distribution unit among the plurality of antennas based on channel information received by the distribution unit and then rate matched and modulated before transmission.

The groups of coded sub-blocks are thus transmitted through one or more of the antennas. During subsequent retransmissions, the same coded block from the first transmission will be used and the number of sub-blocks in each group for each antenna will be re-calculated based on the channel condition of the antenna during the time of retransmission. Subsequently, the sub-blocks in each group are again rate matched and modulated to meet the current channel condition of the antenna through which the sub-blocks group are to be transmitted. The distribution unit retransmits previously transmitted information (or equivalently packet) when a NACK is received but with newly selected number of sub-blocks in each antenna based on the current channel conditions of the antenna.

The method of the present invention provides the initial step of coding the information to be transmitted using a particular coding scheme and base coding rate and then dividing the coded block into at least one group of one or more sub-blocks associated with one antenna of the plurality of antennas. For any particular transmission, one group is transmitted per antenna.

The number of sub-blocks in each group for a particular associated antenna is determined by the channel conditions experienced by that associated antenna at the time of transmission. Then, at least one group containing at least one sub-lock of coded information is then transmitted through one associated antenna after the information is rate matched and modulated to the current channel conditions. A NACK is received when any one of the transmitted groups is received in error. When a NACK is received for the transmitted coded information, the same coded information of the original information block, i.e., the coded block, is used and is divided into groups of sub-blocks of coded information where the at least one or more new groups are associated with the plurality of antennas; the number of sub-blocks of coded information in a new group is based on current channel conditions experienced by the associated antenna for that group.

The associated antenna through which the at least one new group of sub-blocks of coded information for the information is transmitted can be any one of the plurality of antennas whose channel conditions allow for the transmission of the new group. Thus, new groups of sub-blocks of coded information can be repetitively transmitted through the same or different antennas with rate matching and modulation parameters selected based on the most current channel conditions so as to allow the implementation of one H-ARQ in a system that uses MIMO antenna systems.

DETAILED DESCRIPTION

Figure 1:
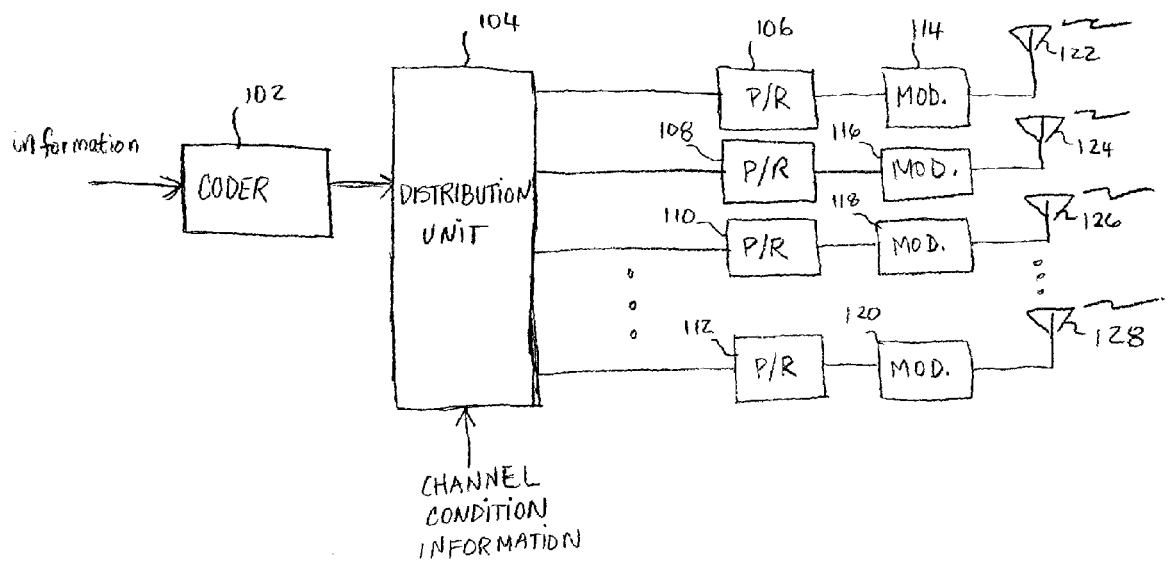
FIG. 1 is a block diagram of the system of the present invention.

The present invention provides a system and method for performing Hybrid ARQ (H-ARQ) in wireless communication systems that use Multiple Input Multiple Output (MIMO) antenna systems with one H-ARQ operation created for the antennas. As a result, the increase in complexity can be avoided when one H-ARQ process is created for all the antennas. One coding process, i.e., a single FEC coder is used across all the antennas and hence only a single coded block (i.e., a single block of coded information) will be generated for the antennas. The system of the present invention is an H-ARQ MIMO system comprising a coder coupled to a distribution unit which is coupled to a plurality of antennas. Original information to be transmitted is coded by the channel coder, which operates at a fixed code rate (also called the base coding rate) and becomes coded information; for this invention the coded information is referred to as a coded block. The coded block is then distributed as packets by the distribution unit among the plurality of antennas based on channel information received by the distribution unit and then rate matched and modulated before transmission. The rate matching is the selective removal and/or addition of bits to the packets so as to match the channel conditions as seen by the antenna through which the packet is to be transmitted. The packets distributed across each antenna is referred to as coded sub-blocks. The channel information are channel conditions experienced by the plurality of antennas; the channel conditions are represented by various channel parameters whose values and/or state are fed back from the receiver which receives information over the channels and thus are able to measure and/or calculate these channel parameters. The channel parameters have values and/or states that indicate quantitatively and/or qualitatively the channel conditions as seen by the plurality of antennas.

The distribution unit distributes the coded block into groups of coded sub-blocks to one or more of the antennas. Therefore, a coded sub-block is a basic unit that forms a coded block. The size of a sub-block can be any positive integer number of bits and all sub-blocks should be of equal size. The number of sub-blocks of coded information in each group is determined by the current channel condition of the specific antenna through which the group is to be transmitted. Once the number of sub-blocks of coded information is determined, the sub-blocks are then rate matched and modulated to meet the current channel condition of the antenna through which the sub-blocks are to be transmitted; these sub-blocks form the group of coded sub-blocks are transmitted through this specific antenna. The groups of coded sub-blocks are thus transmitted through one or more of the antennas. During subsequent retransmissions, the same coded block from the first transmission will be used and the number of sub-blocks in each group for each antenna will be re-calculated based on the channel condition of the antenna during the time of retransmission. Subsequently, the sub-blocks in each group are again rate matched and modulated to meet the current channel condition of the antenna through which the sub-blocks group are to be transmitted. The distribution unit retransmits previously transmitted information (or equivalently packet) when a NACK is received but with newly selected number of sub-blocks in each antenna based on the current channel conditions of the antenna.

The method of the present invention provides the initial step of coding the information to be transmitted using a particular coding scheme and base coding rate and then dividing the coded block into at least one group of one or more sub-blocks associated with one antenna of the plurality of antennas. For any particular transmission, one group is transmitted per antenna.

There may be antennas which are not used at all for certain transmissions and thus such antennas transmit no group during such transmissions. Specifically, the method of the present invention also allows for a particular antenna to be disabled by the transmitter through signaling feedback from the receiver such as channel quality or through the use of other signaling information known as reconfiguration messages; this will thus protect against un-recoverable error in any one of the antennas and would allow a packet to be successfully transmitted through other antennas that are operating normally. The number of sub-blocks in each group for a particular associated antenna is determined by the channel conditions experienced by that associated antenna at the time of transmission. Then, at least one group containing at least one sub-lock of coded information is then transmitted through one associated antenna after the information is rate matched and modulated to the current channel conditions. A NACK is received when any one of the transmitted groups is received in error. When a NACK is received for the transmitted coded information, the same coded information of the original information block, i.e., the coded block, is used and is divided into groups of sub-blocks of coded information where the at least one or more new groups are associated with the plurality of antennas; the number of sub-blocks of coded information in a new group is based on current channel conditions experienced by the associated antenna for that group.

The associated antenna through which the at least one new group of sub-blocks of coded information for the information is transmitted can be any one of the plurality of antennas whose channel conditions allow for the transmission of the new group. Thus, new groups of sub-blocks of coded information can be repetitively transmitted through the same or different antennas with rate matching and modulation parameters selected based on the most current channel conditions so as to allow the implementation of one H-ARQ in a system that uses MIMO antenna systems.

The method and system of the present invention will be described in the context of a Code Division Multiple Access (CDMA) wireless communication system. It will be readily understood that the system and method of the present invention are applicable to various types of multiple access schemes including Time Division Multiple Access (TDMA), Frequency Division Multiple Access (FDMA), and various types of communication systems including telephony systems, packet switching wireline systems such as the Internet and other systems in which ARQ and/or H-ARQ techniques are used.

Referring to FIG. 1 there is shown a block diagram of the system of the present invention. The system comprises coder 102 coupled to distribution unit 104 which is coupled to Puncture/Repetition (P/R) units 106, 108, 110 and 112. The P/R units performs rate matching, and the rate matching parameters are determined by the distribution unit based on the current channel conditions. Each of the P/Rs is coupled to a modulator which is then coupled to an antenna. In particular P/R 106 is coupled to modulator 114 which is coupled to antenna 122; P/R 108 is coupled to modulator 116 which is coupled to antenna 124; P/R 110 is coupled to modulator 118 which is coupled to antenna 126; P/R 112 is coupled to modulator 120 which is coupled to antenna 128.

The original information to be transmitted is applied to Coder 102. Coder 102 can use various well known channel coding schemes to code the original information. The channel coding, in essence, adds redundancy to the original information to make such information more robust within a noisy channel environment. Some well known examples of channel coding schemes are Block coding, Convolutional coding, Turbo coding and Reed Solomon coding. The channel coding allows for error correction at a receiver (i.e., Forward Error Correction). The coding rate is the ratio of the number of information bits to coding bits. For example, a coding rate of 1/3 means that each bit of information is replaced by 3 bits of coded information. The system of the present invention applies the same coding scheme and a base coding rate to all information to be transmitted. Channel coder 102 can be implemented as a processor programmed to perform the coding steps. Channel coder 102 can also be implemented using well known digital circuit blocks. The block of coded information of information is applied to distribution unit 104.

Distribution unit 104 not only receives the block of coded information of information from channel coder 102, but it also receives channel condition information from the receiver (not shown) which has been able to measure and/or derive various channel parameters from signals it has received over the channels via multiple antennas. For example, the channel parameters can be obtained from a channel matrix containing various measured and calculated values performed by the receiver. The receiver transmits the channel condition information stored in the channel matrix over a signaling channel to the system of the present invention and such information is ultimately received by distribution unit 104. Distribution unit 104 can be implemented as a processor that receives channel condition information for the antennas (122-128) and divides the information to be transmitted into one or more groups each containing a number of sub-blocks of coded information. Distribution unit 104 determines the amount of information (number of sub-blocks of coded information) each antenna can transmit based on the channel condition information for that particular antenna.

The amount of information each antenna is first able to transmit is based on a first set of channel and system parameters where the channel parameters reflect the condition of a channel as seen by that particular antenna. The channel parameters are transmitted by one or more other antennas which have received signals over the channel and are able to measure and/or derive the channel parameters. The first number of sub-blocks of coded information of information for a particular antenna i is calculated using various system parameters arranged as the following formula:

$$N_{subblock,i} = \left[ \frac{N_{Walsh} * N_{bps,i} * R_{eff,i}}{SF * N_{bpcb}} * TTI_{sec} * R_{chip} \right], \forall i = 1, \ldots, N \quad (1)$$

where $N_{Walsh}$ represents the number of Walsh codes to be used for transmission of the blocks of coded information. Walsh codes are used in CDMA communication system to make different transmissions orthogonal to each other and to other signals thus preventing different transmissions from interfering with each other or from being interfered with by unwanted noise signals. N is the number of antennas available for transmitting information. N is an integer equal to 2 or greater. $N_{bps,i}$ is the number of bits per symbol performed by the modulator coupled to antenna i as discussed infra. $R_{eff,i}$ is the effective coding rate for antenna i; the effective coding rate not only includes the extra bits added by a coder but also takes into account bits added or removed from the coded information through puncture and/or repetition operations discussed infra. In particular, the effective coding rate is computed as per the following formula:

$$R_{eff,i} = \frac{SF * N_{bpcb} * N_{subblock,i}}{N_{Walsh} * N_{bps,i} * TTI_{sec} * R_{chip}}, \forall i = 1, \ldots, N \quad (2)$$

$TTI_{sec}$ is the transmission time interval (measured in seconds) during which a transmission or a retransmission occurs; $TTI_{sec}$ is a system defined parameter. $R_{chip}$ is also a system defined parameter and it represents the chip rate for the communication system which is the basic timing for the CDMA communication system. SF is the spreading factor which is the number of chips per coded and modulated symbol; chips is defined as $$\frac{1}{R_{chip}}.$$

$N_{bpcb}$ is the number of information bits per sub-block and $N_{subblock,i}$ is the number of sub-blocks in the group of sub-blocks to be transmitted through antenna i. Other groups of sub-blocks of coded information are calculated in the same manner for other antennas. Distribution unit 104 calculates $N_{subblock,i}$ for each antenna i based on the values of the various parameters in equation (1). A group containing $N_{subblock,i}$ sub-blocks is thus associated with antenna i meaning that the group of sub-blocks is scheduled to be transmitted through antenna i. Specifically, after distribution unit 104 has formed the group of sub-blocks, such group is applied to the P/R device that is part of the branch of antenna i. The original information to be transmitted may be transmitted using one or more groups of sub-blocks of coded information. When more than one group of sub-blocks of coded information are used to transmit the original information, each group of sub-block of coded information is transmitted using an antenna whose current channel conditions will allow such transmission. The antennas used to transmit the groups of sub-blocks all use the same Walsh codes; that is, antenna i uses one set of Walsh codes for one group of sub-blocks of coded information and another antenna, say antenna j, uses the same set of Walsh code for transmitting another group of sub-blocks of coded information of the information.

Suppose, for example, antenna 122 is antenna i, then the group of blocks is applied to P/R 106. P/R 106 performs the operations of puncture and repetition; that is P/R 106 either adds extra bits to the group of code blocks (i.e., repetition operation) or selectively removes bits from the group of blocks (i.e., puncturing). The removal and/or addition of bits to blocks of coded information of information is done so as to match the channel conditions. For example, if the channel is in good condition, than the P/R 106 adds extra redundancies by repeating part or all of the coded information to the group of code blocks, if the channel condition is bad, then the P/R 106 removes coded information from the group of sub-blocks. The output of P/R 106 is applied to digital modulator 114 which encodes each symbol as one or more bits. For example, for a QPSK (Quadarature Phase Shift Keying) digital modulator, every two bits of coded information is represented by a symbol. In some instances the number of blocks of coded information determined by distributor 104 for antenna i may contain more or less bits than antenna i can currently transmit. In such cases, the P/R operations are done so as to provide a certain number of bits in the group of blocks of coded information that antenna i can handle.

Continuing with the example above, after a group of sub-blocks of coded information is transmitted through antenna 122, and simultaneously other groups of sub-blocks are transmitted through other appropriate antennas, transmitter equipment (not shown) coupled to the system of the present invention will receive either an ACK or a NACK confirmation message. Receiving equipment (not shown) will receive the transmission, combine the various sub-blocks and attempt to forward error correct (FEC) the received information. If forward error correction is successful the receiving equipment will transmit an ACK confirmation message; successful FEC means that no errors were detected or a system defined acceptable amount of errors were detected and the information can be properly decoded. If forward error correction is not successful, the receiving equipment will transmit a NACK confirmation message; unsuccessful FEC means that one or more errors were detected or a system defined unacceptable amount of errors were detected and the information could not be properly decoded. Suppose a NACK confirmation is transmitted by the receiving equipment, then the original information that was just transmitted through antenna 122 is to be retransmitted. The transmitter reuses the same coded information from the first transmission, divides it into groups of sub-blocks where each group of blocks for an antenna i contains $N_{subblock,i}$ sub-blocks of coded information. The number of sub-blocks of coded information for each group that is to be retransmitted is calculated using the following two sets of formulas:

$$N_{Walsh} * N_{Time\_slots} = \left[ \frac{SF * N_{subblock,i} * N_{bpcb}}{N_{bps,i} * R_{eff,i} * R_{chip} * T_{time\_slot}} \right], \forall\, i = 1, \ldots, N \qquad (3)$$

$$N_{Info\_bits} = \sum_{i=1}^{N} N_{subblock,i} * N_{bpcb} \qquad (4)$$

The parameters in equations (3) and (4) are either known or received by transmission equipment coupled to the system of the present invention. $T_{time\_slot}$ is the length of a defined time slot within a TTI. $N_{Time\_slots}$ is the number of time slots used per packet. A group of sub-blocks of coded information of information is transmitted during a TTI comprising a certain number of time slots where $N_{Time\_slots}$ is the number of time slots used by each group of sub-blocks. Equations (3) and (4) are used to jointly solve for $N_{Walsh}$ and $N_{subblock,i}$. If the number of Walsh codes (i.e., $N_{Walsh}$) needed to retransmit the groups of blocks of coded information is not available, then the system of the present invention uses the maximum number of Walsh codes available for the retransmission; in this case, the effective coding rate is calculated by using the value of the maximum amount of available Walsh code in equation (2). The retransmitted information will again be combined, forward error corrected by the receiving equipment and if successful an ACK confirmation message is sent signaling the transmitting equipment to transmit new or other information. If the forward error correction is not successful, the receiving equipment transmits a NACK confirmation message informing the transmitting equipment to retransmit the information. The number of retransmissions is based on system design.

Figure 2:
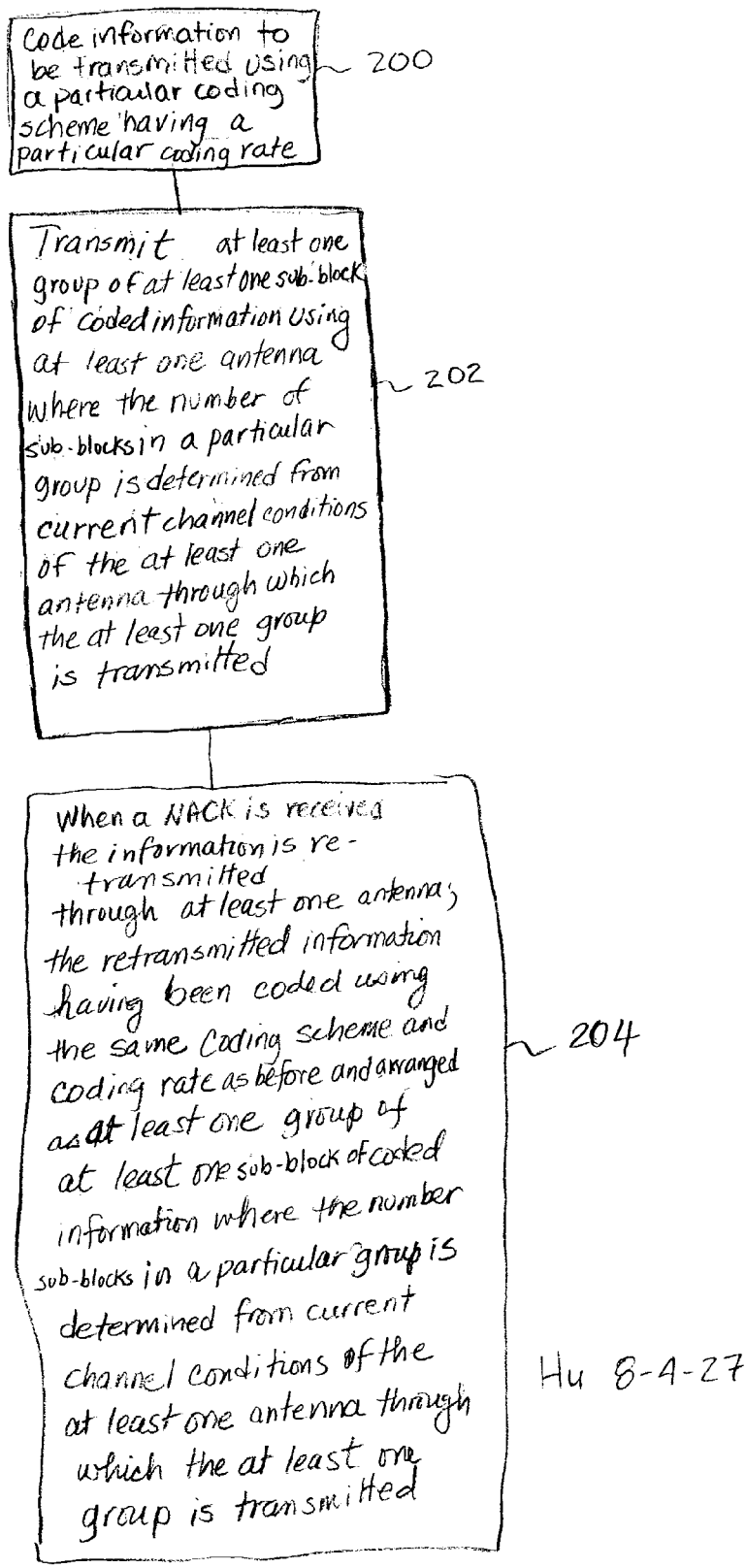
FIG. 2 is a flow chart of the method of the present invention.

Referring now to FIG. 2, in step 200 of the method of the present invention, an original amount of information is coded using any well known channel coding schemes such as those mentioned above. A certain coding rate is applied to the information. In step 202, the coded information is divided into at least one group of sub-blocks of coded information. Each group contains a number of sub-blocks of coded information. Each sub-block of coded information contains a certain number of symbols which can be represented digitally by one or more bits. The number of bits or symbols in each sub-block, i.e., the size of each sub-block can be any positive integer number. The size of all sub-blocks of coded information are equal. Each group of sub-blocks of coded information is associated with an antenna where the channel condition of that antenna will determine the number of sub-blocks of coded information contained in the group. The at least one group of sub-blocks of information is distributed among one or more associated antennas and the at least one group is thus transmitted. For the first transmission of at least one group of sub-blocks of coded information, equation (1) above may be used to calculate the number of sub-blocks of coded information for the each group that is associated with a certain antenna for a CDMA communication system. Equation (2) may be used to calculate the effective coding rate for equation (1). A receiver or receiving equipment receives the transmission and determines whether there are any errors. If there are errors, the receiving equipment performs forward error correction and if successful proceeds to decode the received information and sends an ACK message to the transmitting equipment. If the forward error correction is not successful, the receiving equipment sends a NACK message to the transmitting equipment. After the first transmission, if an ACK is received, other information or new information transmitted in the same manner as in step 202. When a NACK is received, however, the information previously transmitted has to be retransmitted. In step 206, for any subsequent retransmission of the information, the coded information from the first transmission can be reused. For a CDMA communication system, the effective coding rate for any retransmission may be calculated using equation (2) above. For a CDMA communication system, when the number of Walsh codes needed to transmit the group of sub-blocks of coded information of information is not available, the maximum number of Walsh codes available is used in equation (2) to determine the effective coding rate. For a CDMA communication system, the number of sub-blocks of coded information in a group for any retransmission is calculated using equations (3) and (4) above. A receiver or receiving equipment receives the retransmission and determines whether there are any errors. If there are errors, the receiving equipment performs forward error correction and if successful proceeds to decode the received information and sends an ACK message to the transmitting equipment. If the forward error correction is not successful, the receiving equipment sends a NACK message to the transmitting equipment. It is in this manner that the method of the present invention allows for the use of one H-ARQ in communication systems that uses MIMO antenna systems.

We claim:

1. A method for performing Hybrid ARQ in a communication system that uses Multiple Input Multiple Output antenna systems, the method comprising the steps of:
retransmitting through at least one antenna at least one group containing a number of sub-blocks of information coded with a same coding rate as a previous transmission of the information where the number of sub-blocks in the group is determined from current channel condition information of the at least one antenna;
determining the number of sub-blocks in the group for a first transmission from an antenna using a first formula; and
determining the number of sub-blocks in the group for the retransmission from an antenna using a second, different formula.

2. The method of claim 1 where the step of retransmitting is performed after a NACK confirmation message is received.

3. The method of claim 1 where the sub-blocks in each group are associated with a specific antenna.

4. The method of claim 1 where the subblocks in each group are rate matched and modulated according to the channel condition information of the associated antenna.

5. The method of claim 1 where the sub-blocks of coded information in the at least one group are of equal sizes.

6. The method of claim 1, comprising:
transmitting a first transmission of a group of sub-blocks of coded information using an antenna;
determining that the information is to be retransmitted; and
using the same coded information from the first transmission for the retransmission.

7. A system for performing Hybrid ARQ in a communication system that uses Multiple Input Multiple Output antenna systems, the system comprising: at least one antenna; and
a distribution unit for
dividing coded information, with a certain base coding rate, into at least one group containing a number of sub-blocks of coded information and
distributing at least one group to the at least one antenna such that a selected number of sub-blocks is transmitted from the antenna, the number of sub-blocks distributed to the at least one antenna being determined from
(1) channel condition information of at the least one antenna through which the at least one group of at least one sub-block of coded information is to be transmitted or
(2) channel condition information of at the least one antenna through which the at least one group of at least one sub-block of coded information having the same coding rate as a previous transmission is to be retransmitted;
wherein the at least one group of at least one sub-block of coded information is rate matched and modulated using a modulation scheme selected subsequent to the number of sub-blocks being determined for the at least one antenna.

8. The system of claim 7 comprising a coder coupled to the distribution unit where the coder performs channel coding on information to be transmitted using a particular coding scheme having a particular coding rate.

9. The system of claim 7 where the at least one antenna is coupled to the distribution unit via at least one modulator.

10. The system of claim 7 where the at least one group of at least one sub-block of coded information is rate matched and modulated according to a channel condition of the at least one antenna with which the group is associated.

11. The system of claim 7, wherein the distribution is configured for:
determining the number of sub-blocks in the group for a first transmission from an antenna using a first formula; and
determining the number of sub-blocks in the group for the retransmission from an antenna using a second, different formula.

12. A method for performing Hybrid ARQ in a communication system that uses Multiple Input Multiple Output antenna systems, the method comprising:
receiving retransmitted information arranged as one or more groups each having a number of sub-blocks of information coded with a particular coding rate where a group is transmitted through an antenna and the number of sub-blocks of coded information in the group is determined from channel condition information associated with the antenna, wherein the received retransmitted information comprises a number of sub-blocks in the group for a first transmission from an antenna determined using a first formula and a number of sub-blocks in the group for the retransmission from an antenna determined using a second, different formula.

13. The method of claim 12, comprising:
performing Forward Error Correction on the received information; and transmitting
(a) an ACK confirmation message if the Forward Error Correction was successful or
(b) a NACK confirmation message if the Forward Error Correction was unsuccessful.

14. A method for performing Hybrid ARQ in a communication system that uses Multiple Input Multiple Output antenna systems including a plurality of antennas, the method comprising the steps of:
  using a single coding process to provide a coded block of information;
  dividing the coded block into a plurality of sub-blocks;
  determining a number of the sub-blocks to be retransmitted from at least one of the antennas based on current channel condition information of the at least one of the antennas;
  selecting a modulation scheme for use on the at least one of the antennas after determining the number of sub-blocks to be retransmitted from the at least one of the antennas; and
  retransmitting the determined number of the sub-blocks through the at least one antenna, wherein the sub-blocks of information are coded with a same coding rate as a previous transmission of the information.

15. A method for performing Hybrid ARQ in a communication system that uses Multiple Input Multiple Output antenna systems, the method comprising the step of:
  retransmitting through at least one antenna at least one group containing a number of sub-blocks of information coded with a coding rate as a previous transmission of the information where the number of sub-blocks in the group is determined from current channel condition information of the at least one antenna and the number of sub-blocks in the group is determined using a relationship between at least a number of Walsh codes, an effective coding rate used for coding the sub-blocks, a number of bits per symbol, a spreading factor, a number of bits per sub-block, a certain transmission time interval and a chip rate.

16. The method of claim 15 where the communication system is a CDMA communication system and the number of sub-blocks of coded information to be first transmitted through an antenna i of N antennas is calculated from the initial channel conditions with the use of the following formula:

$$N_{subblock,i} = \left\lceil \frac{N_{Walsh} * N_{bps,i} * R_{eff,i}}{SF * N_{bpcb}} * TTI_{sec} * R_{chip} \right\rceil, \forall\, i = 1, \ldots, N$$

where the number of Walsh codes is $N_{walsh}$, the effective coding rate is $R_{eff,i}$, the number of bits per symbol is $N_{bps,i}$, the spreading factor is SF, the number of bits per sub-block is $N_{bpcb}$, the certain transmission time interval is $TTI_{sec}$ and the chip rate is $R_{chip}$, the number of sub-blocks of coded information is $N_{subblock,i}$ for antenna i as per the formula and N is an integer equal to 2 or greater.

17. The method of claim 16 where the effective coding rate, $R_{eff,i}$, for antenna i, is calculated as per the formula:

$$R_{eff,i} = \frac{SF * N_{bpcb} * N_{subblock,i}}{N_{Walsh} * N_{bps,i} * TTI_{sec} * R_{chip}}, \forall\, i = 1, \ldots, N.$$

18. The method of claim 15, wherein the relationship comprises a length of a defined time slot, a number of information bits, and a number of time slots for each block of coded information.

19. The method of claim 18 where the communication system is a CDMA communication system and the number of sub-blocks of information used to retransmit the information through an antenna i of N antennas is calculated using the following formulas:

$$N_{Walsh} * N_{\text{Time\_slots}} = \left\lceil \frac{SF * N_{subblock,i} * N_{pcb}}{N_{bps,i} * R_{eff,i} * R_{chip} * T_{\text{time\_slot}}} \right\rceil, \forall\, i = 1, \ldots, N$$

$$N_{\text{Info\_bits}} = \sum_{i=1}^{N} N_{subblock,i} * N_{bpcb}$$

where, the number of Walsh codes is $N_{walsh}$, the effective coding rate is $R_{eff,i}$, the number of bits per symbol is $N_{bps,i}$, the spreading factor is SF, the number of bits per sub-block is $N_{bpcb}$, the certain transmission time interval is $TTI_{sec}$, the chip rate is $R_{chip}$, the length of a defined time slot is $T_{time\_slot}$, the number of information bits is, $N_{Info\_bits}$, the number of time slots for each block of coded information is $N_{Time\_slots}$, and the number of sub-blocks of coded information is $N_{subblock,i}$ for antenna i as per the formulas and N is an integer equal to 2 or greater.

* * * * *